(12) United States Patent
Burckart et al.

(10) Patent No.: US 8,954,555 B2
(45) Date of Patent: Feb. 10, 2015

(54) USING PUSH NOTIFICATIONS TO REDUCE OPEN BROWSER CONNECTIONS

(75) Inventors: Erik J. Burckart, Raleigh, NC (US); Andrew J. Ivory, Wake Forest, NC (US); Aaron K. Shook, Raleigh, NC (US); David M. Stecher, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 173 days.

(21) Appl. No.: 13/282,916

(22) Filed: Oct. 27, 2011

(65) Prior Publication Data

US 2013/0110997 A1 May 2, 2013

(51) Int. Cl.
*G06F 15/16* (2006.01)
*G06F 17/30* (2006.01)
*H04L 29/08* (2006.01)

(52) U.S. Cl.
CPC .......... *H04L 67/26* (2013.01); *H04L 67/02* (2013.01); *G06F 17/30899* (2013.01)
USPC .......... 709/223; 709/224; 709/225; 709/226; 715/238; 715/273; 715/738

(58) Field of Classification Search
USPC ............. 709/203, 217, 225; 715/27, 238, 279
See application file for complete search history.

(56) References Cited

U.S. PATENT DOCUMENTS

| 6,311,206 B1 | 10/2001 | Malkin et al. |
| 7,299,349 B2 | 11/2007 | Cohen et al. |
| 2004/0163088 A1 | 8/2004 | Frender et al. |
| 2004/0199665 A1* | 10/2004 | Omar et al. ................... 709/238 |
| 2005/0169285 A1 | 8/2005 | Wills et al. |
| 2005/0183092 A1* | 8/2005 | Christensen et al. ......... 719/313 |
| 2006/0168139 A1* | 7/2006 | Messinger et al. ............ 709/219 |
| 2007/0022198 A1* | 1/2007 | Messer et al. ................. 709/227 |
| 2007/0192325 A1 | 8/2007 | Morris |
| 2008/0168130 A1* | 7/2008 | Chen et al. .................... 709/203 |
| 2009/0204666 A1 | 8/2009 | Sana et al. |
| 2010/0094985 A1 | 4/2010 | Abu-Samaha et al. |

FOREIGN PATENT DOCUMENTS

CN        101296256 A     10/2008

OTHER PUBLICATIONS http://www.websiteoptimization.com/speed/tweak/http/ "Minimize HTTP Requests"—Website Optimization, LLC, Apr. 2010.*
http://yensdesign.com/2009/01/speeding-up-your-website-minimize-http-requests/ "Speeding up Your Website: Minimize HTTP Requests"—Adrian Mato Gondelle, Yensdesign, Sep. 2009.*
"Minimize HTTP Requests"—Website Optimization, LLC, Apr. 2010 http://www.websiteoptimization.com/speed/tweak/http/.*

(Continued)

*Primary Examiner* — Randy Scott

(74) *Attorney, Agent, or Firm* — Lee Law, PLLC; Christopher B. Lee

(57) ABSTRACT

A browser request is received at a computing device. A determination is made as to whether to replace the browser request with a push notification based upon characteristics of the browser request. The browser request is replaced with the push notification in response to determining, based upon the characteristics of the browser request, to replace the browser request with the push notification.

12 Claims, 8 Drawing Sheets

(56) References Cited

OTHER PUBLICATIONS

"Speeding up Your Website: Minimize HTTP Requests"—Adrian Mato Gondelle, Yensdesign, Sep. 2009 http://yensdesign.com/2009/01/speeding-up-your-website-minimize-http-requests/.*

United Kingdom Intellectual Property Office, Search and Examination Report for GB Application No. GB1219152.4, Feb. 22, 2013, pp. 1-5, Newport, South Wales, UK.

Author Unknown, Developing Web Applications: AJAX, Presentation, 2010, pp. 1-24, Technical University of Cluj-Napoca, Department of Computer Science, Distributed Systems Research Laboratory (DSRL), Published on the World Wide Web at: http://www.5minmedia.com/Content/Files/2_4_bafbdd37-84da-4026-bfd9-64e8ee56164c.pdf.

Author Unknown, How to: Minimize HTTP Requests—The Most Important Guideline for Improving Web Site Performance, Webpage/site, Jan. 31, 2008, pp. 1-4, Blogging Developer, Published on the World Wide Web at: http://www.bloggingdeveloper.com/post/How-To-Minimize-HTTP-Requests-The-Most-Important-Guideline-for-Improving-Web-Site-Performance.aspx.

Author Unknown, Predictively push related data to client-side in one request—A method for improving the client-side performance of rich web application like IBM Mashups, Technical Disclosure (No. IPCOM000196957D), IP.com Prior Art Database Webpage/site, Jun. 22, 2010, pp. 1-5, IP.com, Published on the World Wide Web at: http://priorartdatabase.com/IPCOM/000196957.

Author Unknown, Minimize HTTP Requests, Webpage/site, Apr. 13, 2010, pp. 1-4, Website Optimization, LLC, Published on the World Wide Web at: http://www.websiteoptimization.com/speed/tweak/http/.

Author Unknown, HTTP-MPLEX, Wikipedia, the free encyclopedia Webpage/site, Apr. 11, 2011, p. 1, Wikimedia Foundation, Inc., Published on the World Wide Web at: http://en.wikipedia.org/wiki/HTTP-MPLEX.

Author Unknown, SPDY, Wikipedia, the free encyclopedia Webpage/site, Oct. 21, 2011, pp. 1-3, Wikimedia Foundation, Inc., Published on the World Wide Web at: http://en.wikipedia.org/wiki/SPDY.

Adrian Mato Gondelle, Speeding Up Your Website: Minimize HTTP Requests, Webpage/site, Sep. 29, 2009, pp. 1-9, yensdesign, Published on the World Wide Web at: http://yensdesign.com/2009/01/speeding-up-your-website-minimize-http-requests/.

United States Patent and Trademark Office, Office Action for U.S. Appl. No. 13/435,167, Jun. 17, 2014, pp. 1-33, Alexandria, VA, USA.

United States Patent and Trademark Office, Office Action for U.S. Appl. No. 13/435,167, Aug. 21, 2014, pp. 1-15, Alexandria, VA, USA.

German Patent and Trademark Office, Office Action for DE Application No. 102012218528.3, Sep. 1, 2014, pp. 1-6, Munich, Germany.

United States Patent and Trademark Office, Notice of Allowance for U.S. Appl. No. 13/435,167, Dec. 8, 2014, pp. 1-15, Alexandria, VA, USA.

United States Patent and Trademark Office, Supplemental Notice of Allowance for U.S. Appl. No. 13/435,167, Dec. 17, 2014, pp. 1-6, Alexandria, VA, USA.

Author Unknown, Push Technology: A Key Ingredient of Application Interactivity, Feb. 2011, pp. 1-9, Seven Networks, Inc. Redwood City, CA, USA.

* cited by examiner

USING PUSH NOTIFICATIONS TO REDUCE OPEN BROWSER CONNECTIONS

BACKGROUND

The present invention relates to web browser request processing. More particularly, the present invention relates to using push notifications to reduce open browser connections.

A web browser executed by a computing device opens a hypertext transfer protocol (HTTP) connection to a web server to request data from the web server. The web server responds to the request via the open HTTP connection. The HTTP connection may be closed after the response from the web server is received by the web browser at the computing device.

BRIEF SUMMARY

A method includes receiving, at a computing device, a browser request; determining whether to replace the browser request with a push notification based upon characteristics of the browser request; and replacing the browser request with the push notification in response to determining to replace the browser request with the push notification based upon the characteristics of the browser request.

A system includes a messaging interface module and a processor programmed to receive, at a computing device, a browser request via the messaging interface module; determine whether to replace the browser request with a push notification based upon characteristics of the browser request; and replace the browser request with the push notification in response to determining to replace the browser request with the push notification based upon the characteristics of the browser request.

A computer program product includes a computer readable storage medium including computer readable program code, where the computer readable program code when executed on a computer causes the computer to receive, at a computing device, a browser request; determine whether to replace the browser request with a push notification based upon characteristics of the browser request; and replace the browser request with the push notification in response to determining to replace the browser request with the push notification based upon the characteristics of the browser request.

DETAILED DESCRIPTION

Figure 1:
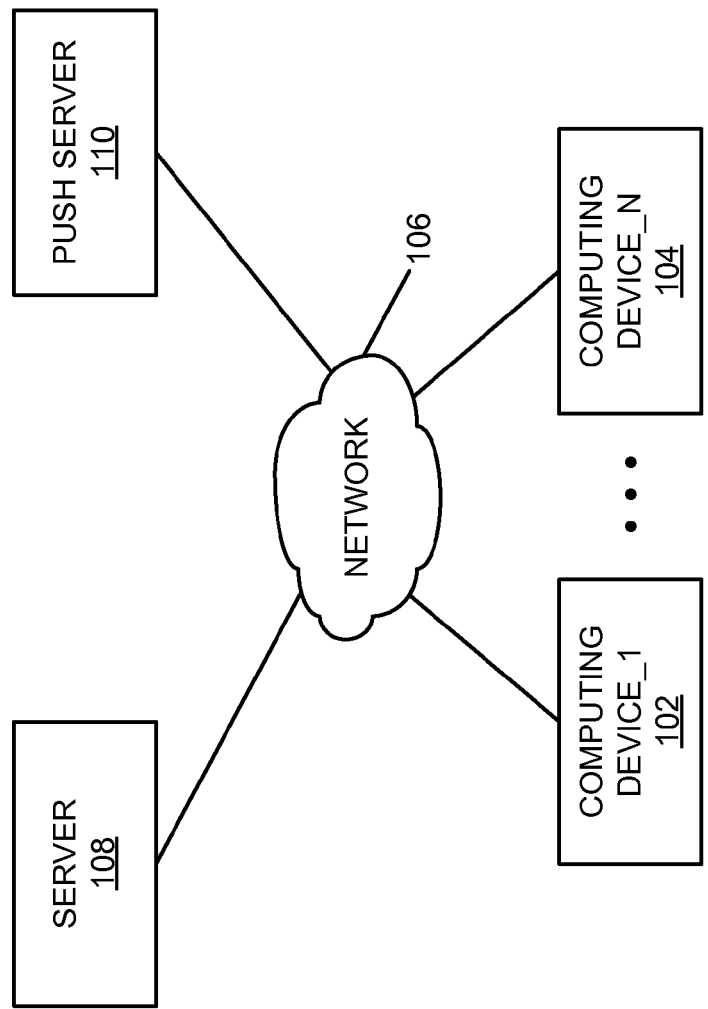
FIG. 1 is a block diagram of an example of an implementation of a system for using push notifications to reduce open browser connections according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides technology for using push notifications to reduce open browser connections. Push notifications are used to replace web browser requests/responses, such as hypertext transfer protocol (HTTP) requests or extensible markup language HTTP requests (XMLHttpRequest—XHR) and the respective responses, so that open connections may be reduced. The present subject matter adapts one or more computing devices to recognize situations either where a request may be an enduring request for updates (e.g., "keep-alive") or where it may take some time for a web server to formulate and reply with a response. In any such situation, the present subject matter operates to convert HTTP requests or XHRs to be implemented via push notifications from a push server. The present subject matter may be implemented at either a client computing device or at a web server device to recognize, via the respective computing device, situations where HTTP requests or XHRs may be converted to push notifications and to perform the respective messaging to implement the conversion and to cause the push server to send the results of the respective request to the client computing device, as described in detail below.

A variety of possible implementations are described herein. For example, a client device may make a determination to convert an HTTP request that would ordinarily be sent to a web server into an XHR request that is instead sent to a push server to instruct the push server to issue an HTTP request to the web server, and to instruct the push server to issue a push notification to the client device with the requested data when the requested data is obtained from the web server. Alternatively, the client device may issue an HTTP request or an XHR request to a web server. The web server may receive the HTTP request or the XHR request via an open HTTP connection and infer that a push notification may be used to replace the outstanding request. The web server may instruct the web browser to close the open HTTP connection and indicate that the web server will push the requested data when the data is available. As such, the present subject matter may be implemented in a variety of manners to use push notifications to reduce open browser connections.

For purposes of the present description, HTTP and/or XHR requests and HTTP connections will be used for purposes of example as web browser requests and web browser connections, respectively. However, it should be understood that the present technology may be applied to any form of web browser requests and web browser connections without departure from the scope of the present subject matter. Further, push notifications, as described herein, may be implemented in any format appropriate for a given implementation. Accordingly, any form of push notification is considered within the scope of the present subject matter.

With further reference to a client device sending an HTTP or XHR request to a web server, for an implementation where a web server determines that a push notification may be used to replace the outstanding request, the web server may send a push identifier (ID) with the instruction to the client device to close the HTTP connection. The client device assigns one or more callback functions/routines to be invoked in response to receipt of a subsequent push notification that includes the push ID. The client device uses the push ID to register the assigned callback function(s). The web server may request a push server to issue a push notification to the client device including the requested data and the push ID. In response to receipt of the push notification, the client device may look up the assigned callback function(s) using the push ID and invoke the callback function(s) to process the requested and received data. The push ID may include, for example, a hash of a timestamp of when the request was received by the web server, a numeric identifier, an alphanumeric identifier, or any other identifier appropriate for a given implementation.

Additionally, for periodic or status-change based data requests, such as sports scores, stock quotes, data subscription requests, or other forms of periodic or status-change based data requests, ongoing push notifications may be configured to cause a push server to issue additional push notifications with data updates from the respective data source at a given periodic interval or in response to status-change or data-change events. Additionally, for timed duration connection requests, such as requests that result in data being requested over a period of time (e.g., keep alive connection requests), push notifications may be configured to cause a push server to issue push notifications with data updates from the respective data source for each data update that is available during the configured period of time. Many other possibilities exist for improvement of web browser connection utilization using push notifications to reduce open browser connections, and all such possibilities are considered within the scope of the present subject matter.

It should be noted that conception of the present subject matter resulted from recognition of certain limitations associated with conventional HTTP connection utilization. For example, it was recognized that conventional use of HTTP connections results in many HTTP connections being open for extended periods of time, such as where data is not instantaneously available from a web server or where periodic updates are requested from a web server via an open HTTP connection. The present subject matter improves HTTP connection utilization by automatically recognizing via a computing device when a push notification may be used to replace an HTTP connection and utilizing one or more push notifications to provide the data requested by a client computing device rather than the HTTP connection, as described above and in more detail below. As such, reduced and improved HTTP connection utilization may be obtained by using push notifications to reduce open browser connections, as described herein.

The automated use of push notifications to reduce open browser connections described herein may be performed in real time to allow prompt reduction in browser connections. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for using push notifications to reduce open browser connections. A computing device_1 102 through a computing device_N 104 communicate via a network 106 with a server 108 and a push server 110. The computing devices 102 through 104 may be considered client computing devices for purposes of the present description.

As will be described in more detail below in association with FIG. 2 through FIG. 8, each of the computing device_1 102 through the computing device_N 104, the server 108, and the push server 110 operate cooperatively to provide automated use of push notifications to reduce open browser connections. The automated use of push notifications to reduce open browser connections is based upon computer recognition of situations where web browser connections, such as HTTP connections or XHR connections, may be replaced with push notifications for data delivery to client devices, such as the computing device_1 102 through a computing device_N 104, for responses to browser requests.

It should be noted that the computing device_1 102 through the computing device_N 104 may be portable computing devices, either by a user's ability to move the respective computing device to different locations, or by the respective computing device's association with a portable platform, such as a plane, train, automobile, or other moving vehicle. It should also be noted that the computing device_1 102 through the computing device_N 104 may be any computing device capable of processing information as described above and in more detail below. For example, the computing device_1 102 through the computing device_N 104 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 108 may include any device capable of providing data for consumption by a device, such as the computing device_1 102 through the computing device_N 104, via a network, such as the network 106. As such, the server 108 may include a web server, application server, or other data server device. The push server 110 may include any device capable of providing push notifications to client devices, such as the computing device_1 102 through the computing device_N 104, with data obtained from the server 108.

Figure 2:
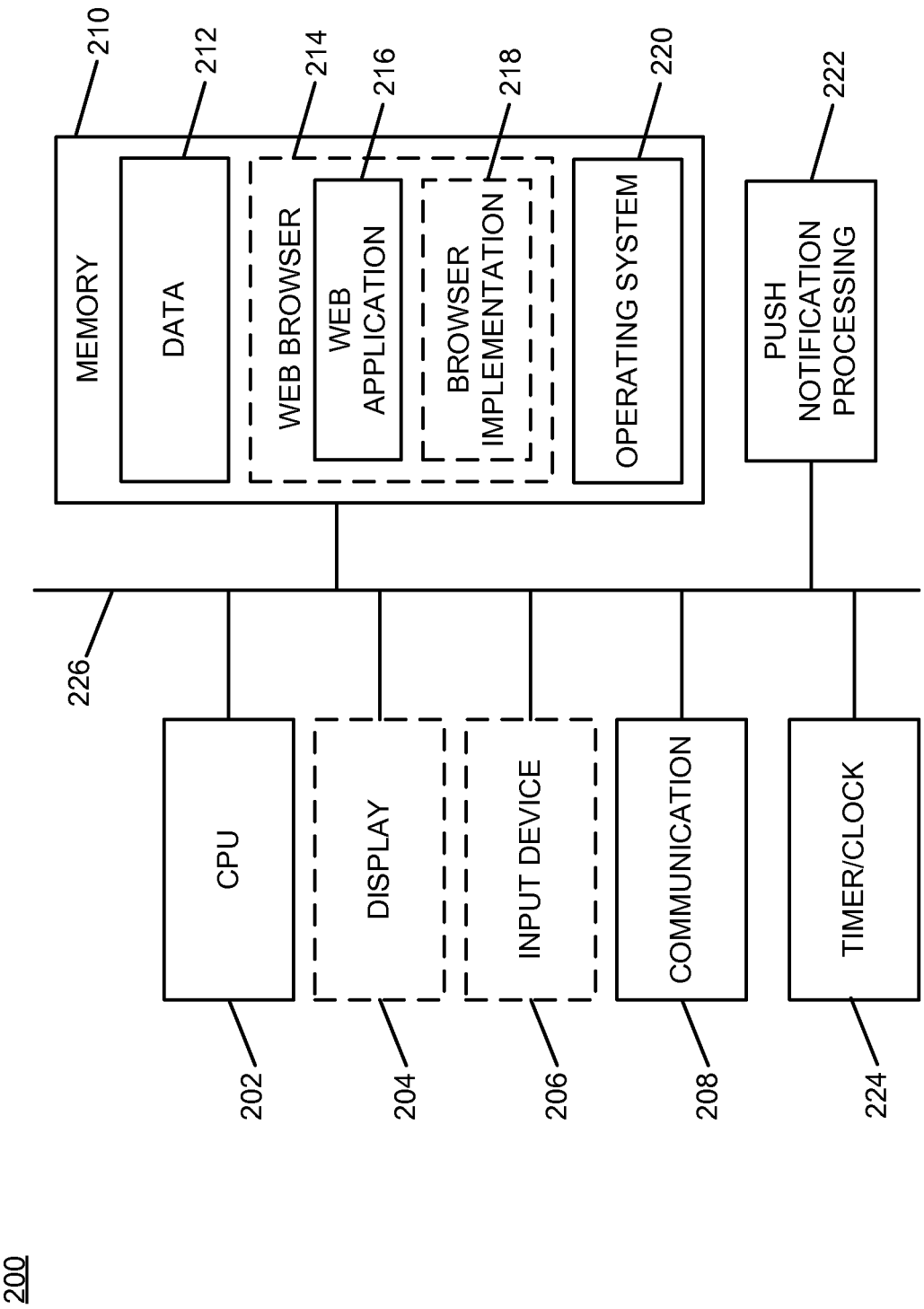
FIG. 2 is a block diagram of an example of an implementation of a core processing module capable of performing operations associated with automated use of push notifications to reduce open browser connections according to an embodiment of the present subject matter.

FIG. 2 is a block diagram of an example of an implementation of a core processing module 200 capable of performing operations associated with automated use of push notifications to reduce open browser connections. The core processing module 200 may be associated with either the computing device_1 102 through the computing device_N 104, the server 108, or the push server 110. The respective modules are described in association with the core processing module 200 for brevity within the present description. However it is understood that the core processing module 200 may be implemented differently within each respective device, as appropriate for the given implementation. Further, the core processing module 200 may provide different and complementary processing for use of push notifications to reduce open browser connections in association with each implementation, as described in more detail below. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively. For example, the computing device_1 102 through the computing device_N 104 may each include the display 204 and the input device 206 for use in association with a web browser, while the server 108 and the push server 110 may be remotely configurable without direct user configurability or feedback, or either device may include the display 204 and the input device 206, as appropriate for the given implementation.

A communication module 208 provides interconnection capabilities that allow the core processing module 200 to communicate with other modules within the system 100 to use push notifications to reduce open browser connections. The communication module 208 may be considered a "messaging interface" or messaging interface module for purposes of the present description. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a data storage area 212 that stores data within the core processing module 200. For implementation of the core processing module 200 at the server 108, the data storage area 212 may store data for retrieval by either the push server 110 or the computing device_1 102 through the computing device_N 104. For implementation of the core processing module 200 at the push server 110, the data storage area 212 may store data retrieved from the server 108 for delivery to any of the computing device_1 102 through the computing device_N 104. For implementation of the core processing module 200 at any of the computing device_1 102 through the computing device_N 104, the data storage area 212 may store data retrieved/obtained from the push server 110, as described in more detail below.

The memory 210 also includes a web browser 214 that may be executed by the computing device_1 102 through the computing device_N 104 within the core processing module 200 implemented in association with client devices. The web browser 214 may include any web browser application appropriate for a given implementation.

The web browser 214 is shown to include a web application 216. The web application 216 may include executable code obtained from a server such as the server 108 via the push server 110 or otherwise. The web application may include executable Java® programming language-implemented or Javascript®-implemented application code or other executable code that may be downloaded and executed within the web browser 214, as appropriate for a given implementation.

The web browser 214 is also shown to include a browser implementation 218. The browser implementation 218 represents an operating system (OS) implementation-specific portion of the web browser 214.

The web browser 214 is also illustrated in a dashed-line representation within FIG. 2 to show that it may be associated with the computing devices 102 through 104. The web application 216 is illustrated in a solid-line representation to show that it may be downloaded from the server 108 and/or the push server 110. The browser implementation 216 is illustrated in a dashed-line representation to show that it may be associated with the computing devices 102 through 104 and selected based upon the operating system executed by the respective client computing device.

An operating system 220 is executed by the CPU 202 for operational control within the core processing module 200. The operating system 220 may be any operating system appropriate for implementation of the core processing module 200 within the respective implementation of the computing device_1 102 through the computing device_N 104, the server 108, and the push server 110. An interface via the operating system 220 to the browser implementation 218, such as for messaging from the web application 216, may be considered a "messaging interface" or messaging interface module for purposes of the present description, in addition to the communication module 208 for external communications received from other devices (e.g., the server 108 and the push server 110).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A push notification processing module 222 is also illustrated. The push notification processing module 222 provides push notification decision making capabilities and processing of push notifications for the core processing module 200, as described above and in more detail below. The push notification processing module 222 implements the automated use of push notifications to reduce open browser connections of the core processing module 200. The push notification processing module 222 may instruct the browser implementation 218 to perform processing associated with push notifications, as described in association with FIG. 3 and FIG. 4 below. Alternatively, as described below, the push notification processing module 222 may be implemented within the browser implementation 218 without departure from the scope of the present subject matter. As such, the examples described herein may refer to the push notification processing module 222 and the browser implementation 218 interchangeably unless explicitly noted below.

Though the push notification processing module 222 is illustrated as a component-level module for ease of illustration and description purposes, it should be noted that the push notification processing module 222 may include any hardware, programmed processor(s), and memory used to carry out the functions of this module as described above and in more detail below. For example, the push notification processing module 222 may include additional controller circuitry in the form of application specific integrated circuits (ASICs), processors, and/or discrete integrated circuits and components for performing communication and electrical control activities associated with the respective devices. Additionally, the push notification processing module 222 may include interrupt-level, stack-level, and application-level modules as appropriate. Furthermore, the push notification processing module 222 may include any memory components used for storage, execution, and data processing for performing processing activities associated with the module.

It should also be noted that the push notification processing module 222 may form a portion of other circuitry described without departure from the scope of the present subject matter. Further, the push notification processing module 222 may alternatively be implemented as an application stored within the memory 210. In such an implementation, the push notification processing module 222 may include instructions executed by the CPU 202 for performing the functionality described herein. The CPU 202 may execute these instructions to provide the processing capabilities described above and in more detail below for the core processing module 200. The push notification processing module 222 may form a portion of an interrupt service routine (ISR), a portion of an operating system, a portion of a browser application such as the browser implementation 218, or a portion of a separate application without departure from the scope of the present subject matter.

A timer/clock module 224 is illustrated and used to determine timing and date information, such as timing for use in association with periodic push notifications, as described above and in more detail below. As such, the push notification processing module 222 may utilize information derived from the timer/clock module 224 for information processing activities, such as the automated use of push notifications to reduce open browser connections.

The CPU 202, the display 204, the input device 206, the communication module 208, the memory 210, the push notification processing module 222, and the timer/clock module 224 are interconnected via an interconnection 226. The interconnection 226 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

For purposes of the examples that follow, the following pseudo syntax examples will be utilized. An example pseudo syntax XMLHttpRequest (XHR) that may be modified as described herein is represented as follows:

```
var pollingRequest= new XMLHttpRequest( );
pollingRequest.onreadystatechange = handler;
pollingRequest.open("GET", "updates.json");
pollingRequest.send( );
```

A web application operating at a computing device may generate the example pseudo syntax XHR to initiate a data request to a web server. The request is noted to be a polling request that results in repeated responses as updates are available for the requested file (e.g., updates.json).

In such a situation, the browser implementation may then send an HTTP message that may be modified as described herein, such as the following pseudo syntax HTTP message, to the web server:

```
GET updates.json HTTP/1.1
Host: foo.com
Connection: keep-alive
```

This request designates the connection as a connection to remain open for some time (e.g., keep-alive). The web server would eventually return a response such as the following example pseudo syntax response with the requested JSON document (e.g., updates.json) attached:

```
HTTP/1.1 200 OK
Date: Tues, Jan 1 2011 10:10:10 GMT
Content-length: 100
```

The above messaging sequence may be modified based upon the subject matter described herein either by a client device, such as the computing device_1 102, or by a server device, such as the server 108. In the case where the processing and message modification is client-device controlled, the browser implementation 218 of the respective client computing device may use underlying push application programming interfaces (APIs), which may be different for each operating system implementation, to register an event to get the "updates.json" file and to subscribe to updates to that file with the push server 110. The push server 110 may then make the previous HTTP request to the server 108 on behalf of the requesting client device, receive the updates, and send the updates to the registered client device.

In the case where the processing and message modification is server controlled, the browser implementation 218 may send a request such as the following pseudo syntax request to the server 108:

```
GET updates.json HTTP/1.1
Host: foo.com
Connection: keep-alive
Push-Control: id=xyz@telco.com
```

The server 108 may recognize that the connection is a request for enduring updates (e.g., keep-alive) and modify the messaging to avoid the open HTTP connection. The server 108 may send back a continue message (e.g., "100 Continue") with an indication that push control processing is enabled, such as the following pseudo syntax response, to acknowledge receipt of the client device request:

```
HTTP/1.1 100 Continue
Push-Control: enabled, 00:30:00
```

This response would inform the respective client device browser implementation 218 that the server 108 accepts this request, and that for the next thirty (30) minutes the server 108 will push all changes to the requesting client device for the requested file (e.g., updates.json) via the push server 110 for identifier (ID) xyz@ teleco.com.

Figure 3:
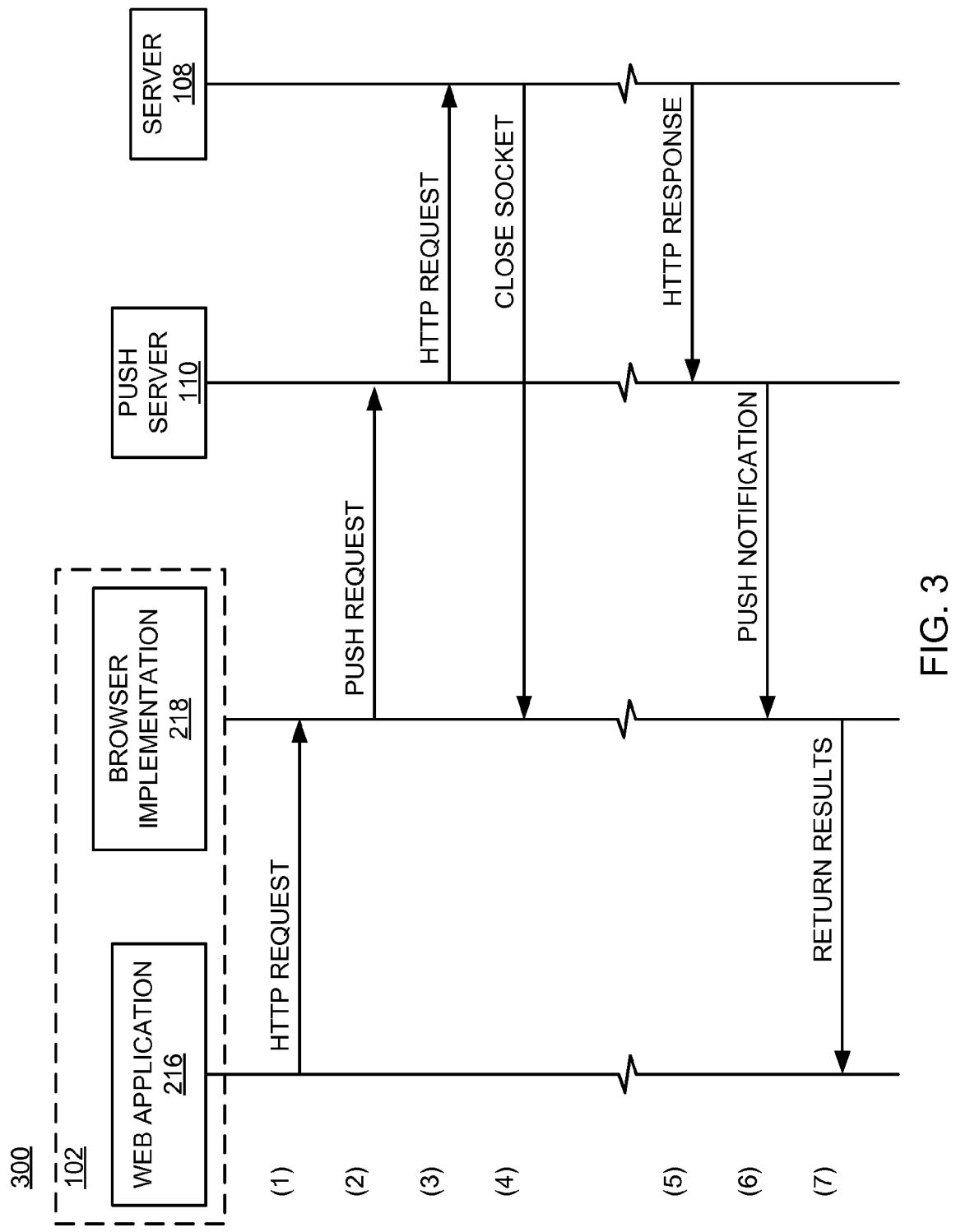
FIG. 3 is a message flow diagram of an example of an implementation of messaging that supports client-controlled processing for configuration of automated use of push notifications to reduce open browser connections that originates from a client computing device according to an embodiment of the present subject matter.

FIG. 3 is a message flow diagram of an example of an implementation of messaging 300 that supports client-controlled processing for configuration of automated use of push notifications to reduce open browser connections that originates from a client computing device, such as the computing device_1 102 through the computing device_N 104. The computing device_1 102 is illustrated along with the server 108 and the push server 110. The web application 216 and the browser implementation 218 operate from within the memory 210, as described above, of the computing device_1 102 under control of the CPU 202. As also described above, the functionality described within the present example associated with the browser implementation 218 may also or alternatively be implemented within the push notification processing module 222 at client devices, such as the computing device_1 102. For the server 108 and the push server 110, the push notification processing module 222 operates to implement the functionality described within the present example, either as a stand-alone module or as a process executed via the CPU 202.

Within the present example, the web application 216 issues an HTTP request (Line 1), such as in association with a data request intended for the server 108, to the browser implementation 218. For purposes of the present example, it is assumed that the initial HTTP request of the pseudo syntax examples described above is issued by the web application 216.

The browser implementation 218 detects the HTTP request and determines that the request is a polling request that would result in the HTTP connection being open for a duration of time (e.g., other than a single request). As a result, the browser implementation 218 determines that use of a push notification may be implemented to reduce an enduring open browser connection that would result from the open HTTP connection.

The browser implementation 218 opens a socket to the push server 110 and blocks a thread operating via the web application 216 that issued the HTTP request. The browser implementation 218 sends a push request to register for the requested data with the push server 110 (Line 2). The push server 110 opens an HTTP connection to the server 108, and generates and sends an HTTP request for the data to the server 108 (Line 3). The server 108 sends a notification to the browser implementation 218 instructing the browser implementation 218 to close the open socket (Line 4). The browser implementation 218 closes the open socket, thus freeing an open HTTP connection. As such, the browser implementation 218 may conserve battery power if on battery power by not polling an open socket.

At some later time when the requested data is available or when an update to the requested subscription is available, the server 108 generates and sends an HTTP response to the push server 110 including the requested data (Line 5). The push server 110 closes the HTTP connection with the server 108, and generates and sends a push notification to the browser implementation 218 (Line 6) that includes the requested data/update. The browser implementation 218 unblocks the thread of the web application 216 and returns the results of the original HTTP request to the web application 216 (Line 7).

As such, the message flow 300 illustrates one example of a situation where a client device identifies a request that may be modified to use a push notification. The client device communicates with a push server to register for the requested data and the push server communicates via an HTTP connection with a web server to retrieve the requested data. It should be noted that for periodic updates the push server 110 may periodically open an HTTP connection to retrieve the requested data and close the HTTP connection in response to receipt of the requested data for each update period. As such, open HTTP connections may be minimized.

Figure 4:
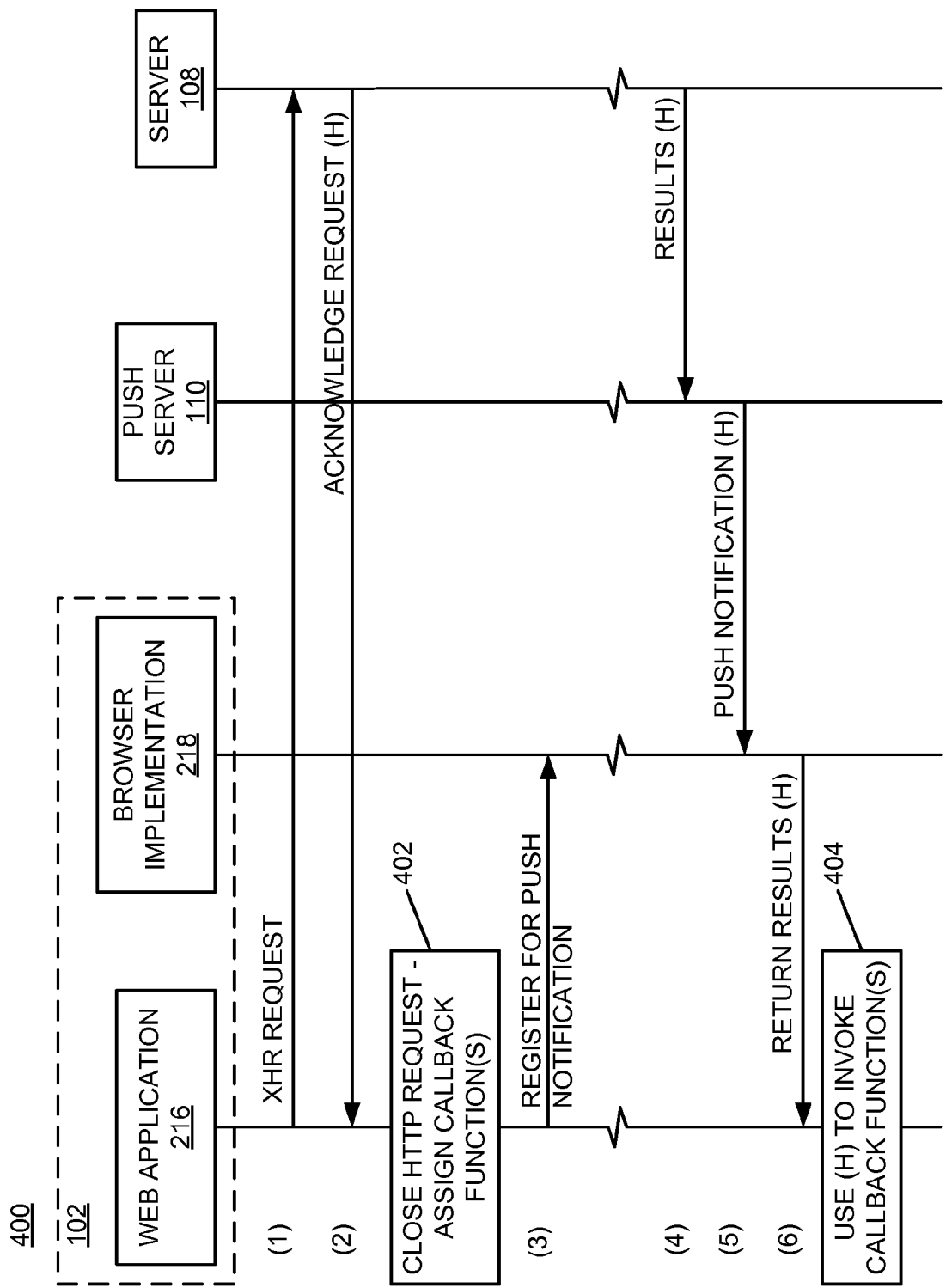
FIG. 4 is a message flow diagram of an example of an implementation of messaging that supports server-controlled processing for configuration of automated use of push notifications to reduce open browser connections that originates from a web server device according to an embodiment of the present subject matter.

FIG. 4 is a message flow diagram of an example of an implementation of messaging 400 that supports server-controlled processing for configuration of automated use of push notifications to reduce open browser connections that originates from a web server device, such as the server 108. As with FIG. 3, the computing device_1 102 is illustrated along with the server 108 and the push server 110. The web application 216 and the browser implementation 218 operate from within the memory 210, as described above, of the computing device_1 102 under control of the CPU 202. As also described above, the functionality described within the present example associated with the browser implementation 218 may also or alternatively be implemented within the push notification processing module 222 at client devices, such as the computing device_1 102. For the server 108 and the push server 110, the push notification processing module 222 operates to implement the functionality described within the present example.

Within the present example, the web application 216 issues an XHR request (Line 1) to the server 108. For purposes of the present example, it is assumed that the initial XHR request of the pseudo syntax examples described above is issued by the web application 216.

The server 108 may recognize that the request is a polling request that would result in the HTTP connection being open for an extended duration of time or that fulfilling the data request may take some time to complete. As a result, the server 108 determines that use of a push notification may be implemented to reduce an enduring open browser connection that would result from the open HTTP connection associated with the XHR request.

The server 108 generates and sends an acknowledgement of the XHR request to the web application 216 (Line 2), such as that described in association with the last pseudo syntax example above. The acknowledgement operates to notify the web application 216 that the server 108 intends to use a push notification to return the requested data. For purposes of the present example, the server 108 also generates a hash (H) of a timestamp (e.g., using the clock/timer 224) at which the XHR request was received and sends the hash (H) along with the acknowledgement to the web application 216.

In response to receipt of the acknowledgement from the server 108, the web application 216 closes the HTTP request connection associated with the initial XHR and assigns one or more callback functions/routines to be executed in response to receipt of the push notification at block 402. The web application 216 sends a request to register with the browser implementation 218 for the push notification (Line 3).

At some time later when the requested data is available or when an update to the requested subscription is available, the server 108 generates and sends an HTTP response to the push server 110 including the requested data and the hash (H) of the original timestamp associated with the request (Line 4). The push server 110 closes the HTTP connection with the server 108, looks up the registration information for the push request, and generates and sends a push notification to the browser implementation 218 that includes the requested data/data update and the hash (H) of the timestamp (Line 5). The browser implementation 218 returns the results of the original XHR request and the hash (H) of the timestamp to the web application 216 (Line 6). The web application 216 uses the hash (H) of the timestamp to invoke the respective assigned callback function(s) at block 404 and processes the results returned from the server 108.

As such, the message flow 400 illustrates one example of a situation where a server device identifies a request that may be modified to use a push notification. The server device acknowledges the request of the client device and informs the client device that a push notification will be used to return the requested data, and includes an identifier to correlate the push notification with the acknowledgment. It should be noted that the present example utilizes a hash (H) of a timestamp of a time at which the request was received as the correlation identifier. However, any identifier appropriate for a given implementation may be used. The client device assigns one or more callback functions/routines to process the push notification and registers with the browser implementation to receive the push notification. The server communicates with a push server to send the requested data and the correlation identifier via an HTTP connection with the push server. The push notification with the correlation identifier is propagated to the requesting client device. The client device looks up the push notification using the correlation identifier and invokes the assigned callback function(s). It should be noted that for periodic updates the push server may periodically open an HTTP connection to send the requested data and close the HTTP connection in response to receipt of the requested data by the push server for each update period. As such, open HTTP connections may be minimized.

FIG. 5 through FIG. 8 described below represent example processes that may be executed by devices, such as the core processing module 200, to perform the automated use of push notifications to reduce open browser connections associated with the present subject matter. Many other variations on the example processes are possible and all are considered within the scope of the present subject matter. The example processes may be performed by modules, such as the push notification processing module 222 and/or executed by the CPU 202 via the browser implementation 218, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

Figure 5:
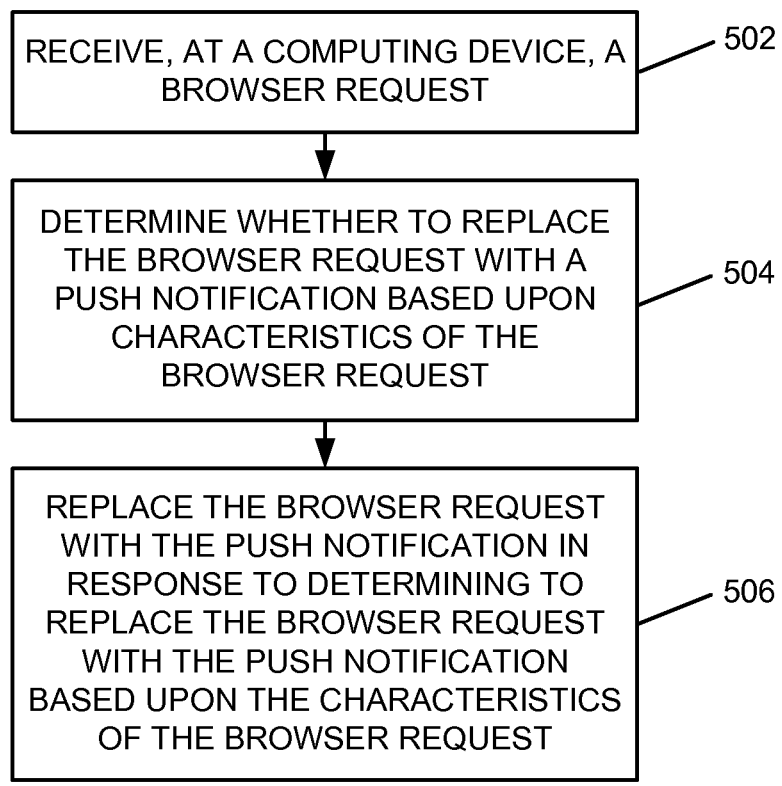
FIG. 5 is a flow chart of an example of an implementation of a process for automated use of push notifications to reduce open browser connections according to an embodiment of the present subject matter.

FIG. 5 is a flow chart of an example of an implementation of a process 500 for automated use of push notifications to reduce open browser connections. At block 502, the process 500 receives, at a computing device, a browser request. At block 504, the process 500 determines whether to replace the browser request with a push notification based upon characteristics of the browser request. At block 506, the process 500 replaces the browser request with the push notification in response to determining to replace the browser request with the push notification based upon the characteristics of the browser request.

Figure 6:
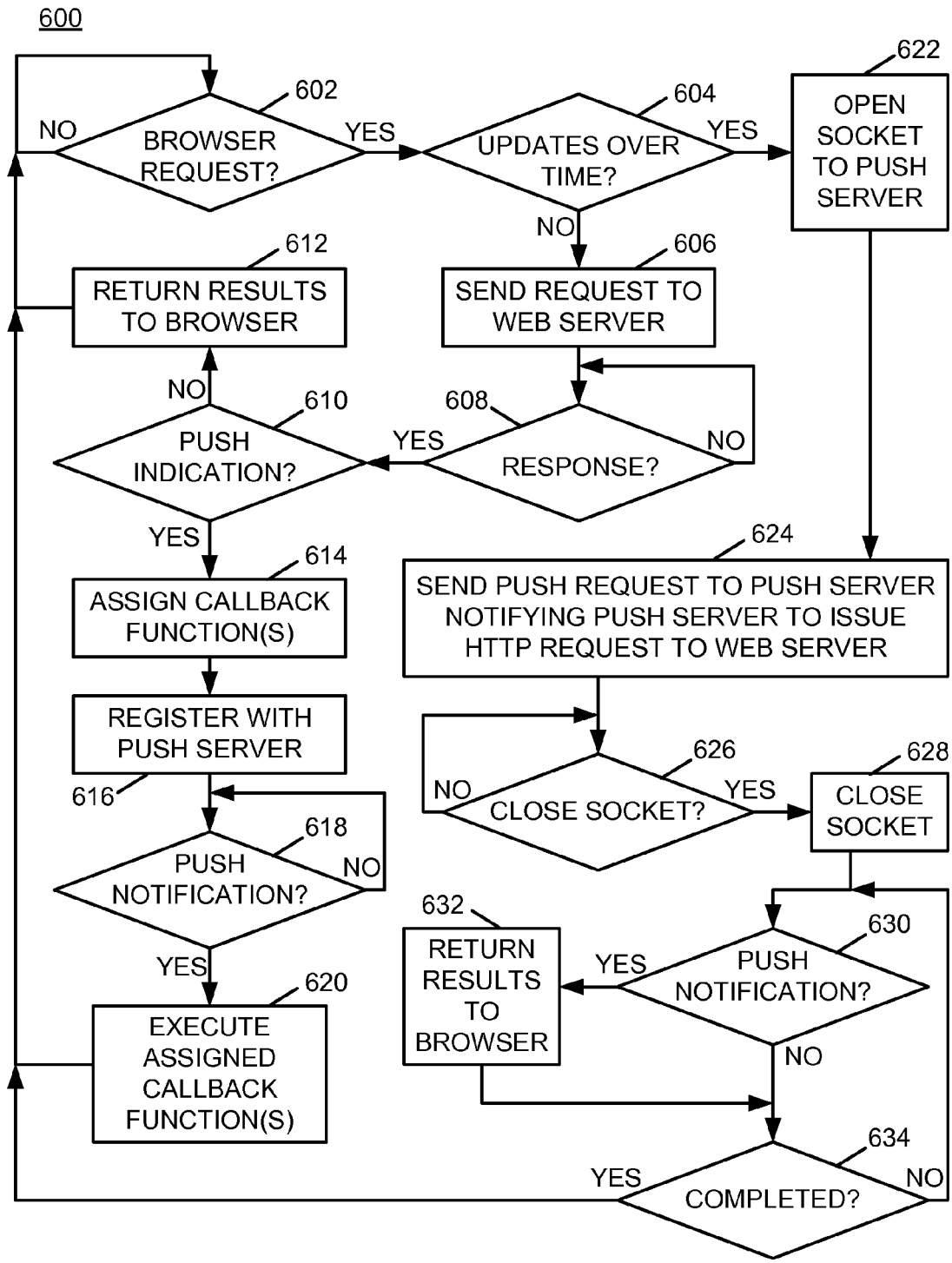
FIG. 6 is a flow chart of an example of an implementation of a process for automated use of push notifications to reduce open browser connections at a client computing device according to an embodiment of the present subject matter.

FIG. 6 is a flow chart of an example of an implementation of a process 600 for automated use of push notifications to reduce open browser connections at a client computing device, such as the computing device_1 102 through the computing device_N 104. As described above, the process 600 may be implemented by the browser implementation 218 or the push notification processing module 222 or the respective client computing device, as appropriate for the given implementation.

At decision point 602, the process 600 makes a determination as to whether a browser request has been received/detected. As described above, the browser request may include an HTTP request or an XHR, and may be received from web application code, such as the web application 216.

In response to determining that a browser request has been received/detected, the process 600 makes a determination at decision point 604 as to whether the browser request includes a request for updates over time (e.g., a polling request or a request with a "keep-alive" attribute set). A browser request for updates over time is one example of a situation that may be used to replace a browser request with a push notification, and to use push notifications to reduce open browser connections. However, it should be noted that other possibilities exist for using push notifications to reduce open browser connections and all are considered within the scope of the present subject matter. Further, use of push notifications to reduce open browser connections may be implemented for all browser requests without making a determination such as the determination at decision point 604 where appropriate for a given implementation without departure from the scope of the present subject matter.

In response to determining that the request does not include a request for updates over time, the process 600 sends the request to a web server, such as the server 108, at block 606. At decision point 608, the process makes a determination as to whether a response has been received from the web server. It should be noted that the response from the web server may include a response to the browser request including data that fulfills the request or may include an acknowledgement from the web server including an indication (e.g., push indication) that the web server will push the response to the web request via a push server, such as the push server 110.

In response to determining at decision point 608 that a response has been received, the process 600 makes a determination as to whether the response includes a push indication at decision point 610. It should be noted that the acknowledgement may further include an identifier assigned to the browser request by the web server that may be used to correlate any subsequent push notification(s) with the original browser request.

In response to determining that the response does not include a push indication at decision point 610, the process 600 returns the result data (results) in the response to the browser application at block 612. The process 600 returns to decision point 602 and iterates as described above.

In response to determining that the response includes a push indication at decision point 610, the process 600 assigns one or more callback functions to be executed in response to receipt of the push notification to be received from the web server at block 614. At block 616, the process 600 registers for the push notification with the respective push server. At decision point 618, the process 600 makes a determination as to whether a push notification has been received from the push server. In response to determining that a push notification has been received from the push server, the process 600 executes the assigned callback function(s) at block 620. The identifier assigned to the browser request by the web server may be used to lookup the assigned callback function(s) for execution of the respective callback function(s). The process 600 returns to decision point 602 and iterates as described above.

Returning to the description of decision point 604, in response to determining that the browser request includes a request for updates over time (e.g., a polling request or a request with a "keep-alive" attribute set), the process 600 opens a socket for communications with a push server, such as the push server 110, at block 622. At block 624, the process 600 notifies the respective push server to issue the HTTP request to the web server associated with the web request. This notification may be performed, for example, using an underlying push application programming interface (API), which may be different for each operating system implementation, to register for the respective updates associated with the web request. The push server may then make the previous web request, such as via an HTTP request, to the respective web server on behalf of the requesting client device, receive the updates, and send/push the updates to the registered client device, as described in more detail below. Further, the push request to the push server may include a request for a series of push notifications to be issued to replace the browser request for the updates to the requested data over time, and as such cause the push server to issue a series of push notifications with data updates to the client computing device.

At decision point 626, the process 600 makes a determination as to whether an indication to close the socket associated with the web request has been received from the web server associated with the original browser request. The indication from the web server represents an acknowledgement of the notification from the push server to issue the browser request to the web server. As such, the communication loop between the three devices is acknowledged by receipt of the indication to close the socket. The process 600 closes the socket at block 628.

At decision point 630, the process 600 makes a determination as to whether a first push notification from the push server with the results of a web reply to the browser request issued by the push server to the web server has been received. In response to determining that a push notification has been received from the push server with the results of a web reply to the browser request issued by the push server to the web server, the process 600 returns the results to the browser application at block 632.

In response to either completion of returning the results to the browser application at block 632 or determining at decision point 630 that a push notification has not been received, the process 600 makes a determination at decision point 634 as to whether processing of push notifications has been completed for the respective original browser request (e.g., a time period associated with the original request has expired, or a specified number of push notifications have been received). As described above, the original push request to the push server may include a request for a series of push notifications to be issued to replace the browser request for the updates to the requested data over time to cause the push server to issue a series of push notifications including data updates associated with the original browser request.

In response to determining at decision point 634 that processing of push notifications has not been completed, the process 600 returns to decision point 630 and iterates as described above. In response to determining at decision point 634 that processing of push notifications has been completed, the process 600 returns to decision point 602 and iterates as described above.

As such, the process 600 operates at a client computing device to make determinations as to whether a browser request may be replaced with one or more push notifications. The determination may be based upon characteristics of the browser request, such as that the browser request includes a request for updates over time (e.g., a polling request or a "keep-alive" request). The process 600 may process push indications from a web server that include an indication that the web server will push the response to the browser request, and may assign one or more callback functions/routines to process the push notification(s). The process 600 may alternatively autonomously initiate push notification processing by sending a push request to a push server that requests the push server to operate a proxy for the client computing device and to issue the browser request to the web server. The process 600 may process multiple push notifications over time that would otherwise have required an open browser connection throughout the duration. As such, open browser connections may be reduced using push notifications as described herein.

Figure 7:
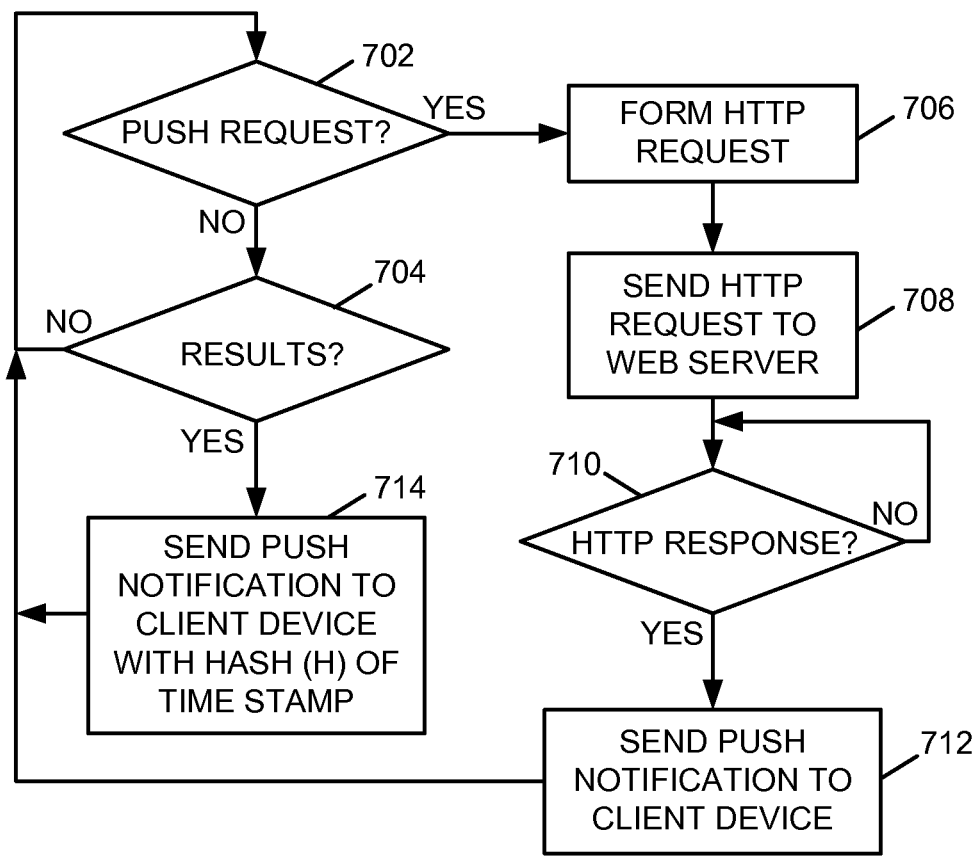
FIG. 7 is a flow chart of an example of an implementation of a process for automated use of push notifications to reduce open browser connections at a push server device according to an embodiment of the present subject matter.

FIG. 7 is a flow chart of an example of an implementation of a process 700 for automated use of push notifications to reduce open browser connections at a push server device, such as the push server 110. As described above, the process 700 may be implemented by the push notification processing module 222 of the push server 110.

At decision point 702, the process 700 makes a determination as to whether a push request has been received. As described above, a push request may be received, for example, from a client computing device, such as the computing device_1 102 through the computing device_N 104, at a push server such as the push server 110. The push request may cause the push server 110 to initiate an HTTP connection and request to a web server, such as the server 108 as a proxy and on behalf of the requesting client computing device. In response to determining that a push request has not been received, the process 700 makes a determination at decision point 704 as to whether results of a browser request have been received. As described above, results of a browser request may be received from a web server, such as the server 108, in response to initiation of a browser request by a client computing device. Further, the results that are received may include an identifier (e.g., a hash of a timestamp of the time at which the initial browser request was received) assigned to the browser request by the web server device to allow the client computing device to utilize callback functions/routines to process the subsequent results that are returned via a push notification. In response to determining that results of a browser request have not been received, the process 700 returns to decision point 702 and iterates as described above.

Returning to the description of decision point 702, in response to determining that a push request has been received, the process 700 forms an HTTP request using information received within the push request that identifies the target web server and the requested information at block 706. At block 708, the process 700 sends the HTTP request to the designated/identified web server. At decision point 710, the process 700 makes a determination as to whether an HTTP response has been received from the designated web server. In response to determining that the HTTP response has been received, the process 700 sends a push notification to the requesting client device with the results of the HTTP request initiated by the push server 110 at block 712. The process 700 returns to decision point 702 and iterates as described above.

Returning to the description of decision point 704, in response to determining that results of a browser request have been received, the process 700 sends a push notification to a client device designated/identified within the results of the browser request that was initiated via the web server 108 at block 714. As described above, the results may include an identifier (e.g., a hash of a timestamp of the time at which the initial browser request was received) assigned to the outstanding browser request by the web server that may be used by the client computing device to invoke a callback routine to process the results of the browser request. The process 700 returns to decision point 702 and iterates as described above.

As such, the process 700 operates to process both push requests that are initiated by client computing devices and autonomously receive results that include identifiers of initial browser requests. Accordingly, the process 700 operates to facilitate the example implementations described above for interactions between multiple computing devices to use push notifications to reduce open browser connections.

Figure 8:
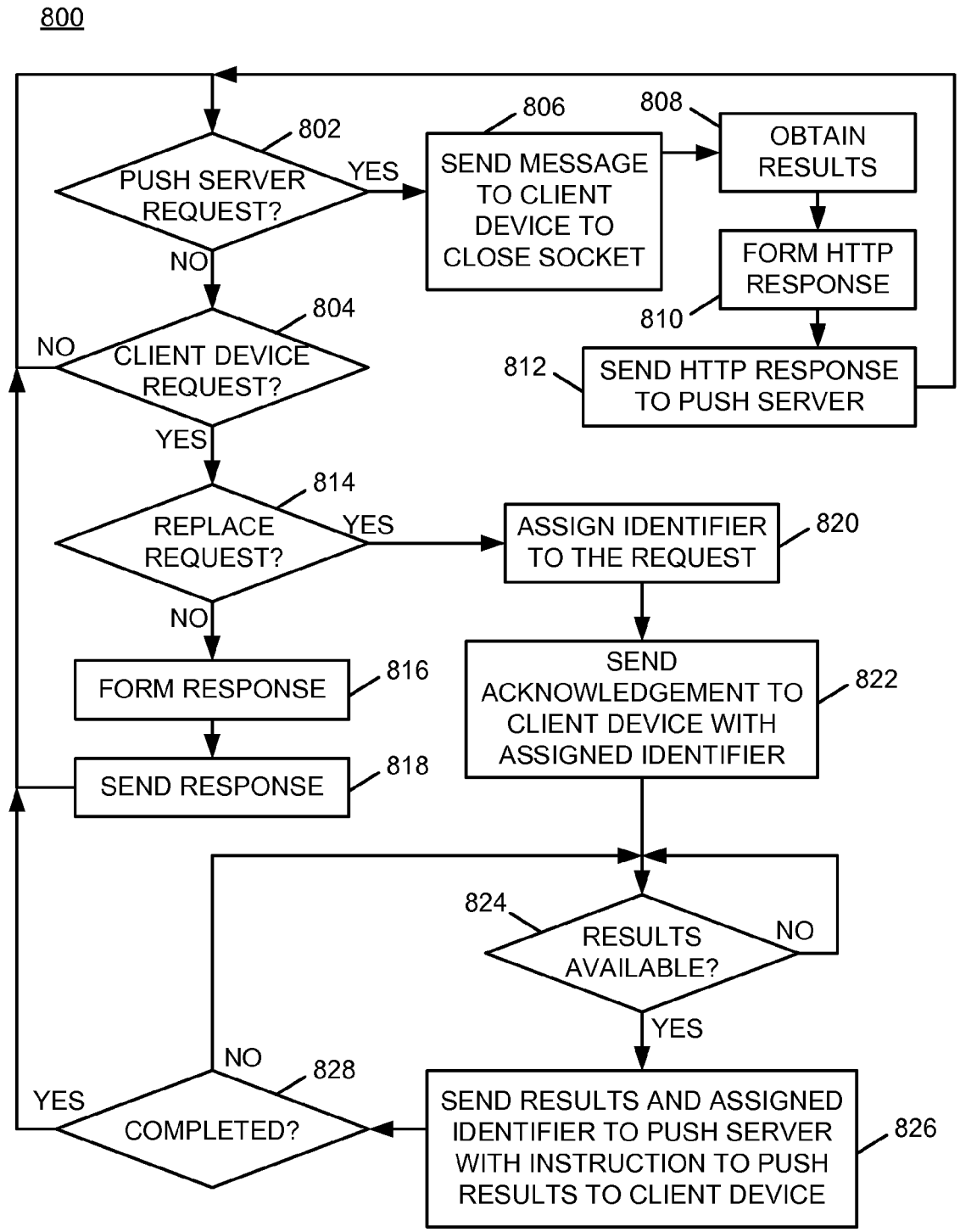
FIG. 8 is a flow chart of an example of an implementation of a process for automated use of push notifications to reduce open browser connections at a web server device according to an embodiment of the present subject matter.

FIG. 8 is a flow chart of an example of an implementation of a process 800 for automated use of push notifications to reduce open browser connections at a web server device, such as the server 108. As described above, the process 800 may be implemented by the push notification processing module 222 of the server 108.

At decision point 802, the process 800 makes a determination as to whether a push server HTTP request has been received that instructs the server 108 to respond to the push server 110 via an HTTP response with the results. As described above, a push server HTTP request may be received, for example, from a push server such as the push server 110, in response to a push request received from the requesting client computing device. In response to determining that a push server HTTP request has not been received, the process 800 makes a determination at decision point 804 as to whether a browser request (e.g., HTTP or XHR) has been received from a client computing device, such as one of the computing device_1 102 through the computing device_N 104. In response to determining that a browser request has not been received from a client computing device, the process 800 returns to decision point 802 and iterates as described above.

Returning to the description of decision point 802, in response to determining that a push server HTTP request has been received that instructs the server 108 to respond to the push server 110 via an HTTP response with the results, the process 800 sends a message to the requesting client computing device instructing the client computing device to close any open socket associated with its communications with the push server 110 at block 806. At block 808, the process 800 obtains the requested results associated with the original browser request as received from the push server 110 within the push server request. At block 810, the process 800 forms an HTTP response including the requested data. At block 812, the process 800 sends the HTTP response to the push server 110. As described above, the push server 110 may utilize a push notification to provide the results to the requesting client computing device. The process 800 returns to decision point 802 and iterates as described above.

Returning to the description of decision point 804, in response to determining that a browser request (e.g., HTTP or XHR) has been received from a client computing device, the process 800, makes a determination at decision point 814 as to whether to replace the browser request with one or more push notifications. Any decision criteria appropriate for a given implementation may be used. For example, the process 800 may determine that the browser request includes a request for updates over time or that the request may take a long time to fulfill due to data preparation times or other factors. In response to determining not to replace the browser request with one or more push notifications, the process 800 forms a response to the browser request at block 816, sends the response to the browser request to the requesting client computing device at block 818, and returns to decision point 802 and iterates as described above.

In response to determining to replace the browser request with one or more push notifications at decision point 814, the process 800 assigns an identifier to the browser request (e.g., HTTP request of XHR) received from the client device at block 820. As described above, the assigned identifier may include a hash (H) of a timestamp of a time at which the browser request was received. This hash value may be generated using information derived from a module, such as the timer/clock module 224.

At block 822, the process 800 sends an acknowledgement to the client computing device including an identifier assigned to the browser request. As described above, updates that are requested over time (e.g., sports scores, stock quotes, etc.) may be generated periodically, on a data change (e.g., score or price change), or otherwise as appropriate for a given implementation. As such, many variations on update events are possible and all such variations are considered within the scope of the present subject matter.

At decision point 824, the process 800 makes a determination as to whether results to fulfill at least one iteration of the browser request are available. In response to determining that results are available to fulfill at least one iteration of the browser request, the process 800 sends results of the browser request to the push server 110 with an instruction to push the results to the requesting client device via a push notification at block 826. The results sent to the push server 110 may include the identifier assigned to the browser request (e.g., hash value of the timestamp of the time at which the request was received).

At decision point 828, the process 800 determines whether processing of the outstanding request is completed (e.g., whether it was a request for a single result data set or a browser request for updates over time). In response to determining that processing of the outstanding request is not completed, the process 800 returns to decision point 824 and iterates as described above to process additional results data sets. In response to determining at decision point 828 that processing of the outstanding request is completed, the process 800 returns to decision point 802 and iterates as described above.

As such, the process 800 operates to process browser requests from either a push server or a client computing device. The process 800 may assign identifiers to browser requests and inform requesting client devices that it will use push notifications to reduce open browser connections. The process 800 may obtain results to the browser request over time and send them to the push server for forwarding to the requesting client computing device via push notifications to reduce open browser connections.

As described above in association with FIG. 1 through FIG. 8, the example systems and processes provide for use of push notifications to reduce open browser connections. Many other variations and additional activities associated with use of push notifications to reduce open browser connections are possible and all are considered within the scope of the present subject matter.

Those skilled in the art will recognize, upon consideration of the above teachings, that certain of the above examples are based upon use of a programmed processor, such as CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a messaging interface module; and
a processor programmed to:
  receive, at a web server computing device, a browser request via the messaging interface module comprising one of a hypertext transfer protocol (HTTP) request and an extensible markup language (XML) HTTP request (XMLHttpRequest - XHR) originated from a client computing device;
  determine whether to replace the one of the HTTP request and the XHR with a push notification based upon whether data requested by the one of the HTTP request and the XHR will take longer than a configured period of time to return to the client computing device, comprising the processor being programmed to:
    determine whether the one of the HTTP request and the XHR comprises a request for updates to requested data over time; and
  replace the one of the HTTP request and the XHR with the push notification in response to determining that the data requested by the one of the HTTP request and the XHR will take longer than the configured period of time to return to the client computing device.

2. The system of claim 1, where, in being programmed to replace the one of the HTTP request and the XHR with the push notification, the processor is programmed to cause a series of push notifications to be issued to replace the one of the HTTP request and the XHR for the updates to the requested data over time.

3. The system of claim 1, where the one of the HTTP request and the XHR comprises the HTTP request, and where, in being programmed to receive, at the web server computing device, the browser request, the processor is programmed to receive the HTTP request from
a push server that issued the HTTP request to the web server computing device in response to a push request sent to the push server from the client computing device; and
the processor is further programmed to, in response to the receiving the HTTP request from the push server:
  instruct the client computing device to close an open socket used by the client computing device; and
  send an HTTP response with results of the HTTP request to the push server on behalf of the client computing device, where the push notification is sent from the push server to the client computing device with the results of the HTTP response to the HTTP request.

4. The system of claim 1, where,
in being programmed to determine whether to replace the one of the HTTP request and the XHR with the push notification based upon whether the data requested by the one of the HTTP request and the XHR will take longer than the configured period of time to return to the client computing device, the processor is programmed to:
  determine that the one of the HTTP request and the XHR comprises a polling request that would result in an HTTP connection being open for an extended duration of time that exceeds the configured period of time.

5. The system of claim 1, where, in being programmed to:
replace the one of the HTTP request and the XHR with the push notification in response to determining that the data requested by the one of the HTTP request and the XHR will take longer than the configured period of time to return to the client computing device, the processor is programmed to:
assign an identifier to the one of the HTTP request and the XHR received from the client computing device;
send an acknowledgement to the client computing device comprising the identifier assigned to the one of the HTTP request and the XHR; and
send results of the one of the HTTP request and the XHR to a push server with the identifier assigned to the one of the HTTP request and the XHR.

6. The system of claim 5, where the processor is further programmed to:
generate a hash (H) of a timestamp at which the one of the HTTP request and the XHR was received; and
send the hash (H) along with the acknowledgement to the client computing device.

7. A computer program product comprising a computer readable storage device including computer readable program code, where the computer readable program code when executed on a computer causes the computer to:
receive, at a web server computing device, a browser request comprising one of a hypertext transfer protocol (HTTP) request and an extensible markup language (XML) HTTP request (XMLHttpRequest—XHR) originated from a client computing device;
determine whether to replace the one of the HTTP request and the XHR with a push notification based upon whether data requested by the one of the HTTP request and the XHR will take longer than a configured period of time to return to the client computing device, comprising the computer readable program code when executed on the computer causing the computer to:
determine whether the one of the HTTP request and the XHR comprises a request for updates to requested data over time; and
replace the one of the HTTP request and the XHR with the push notification in response to determining that the data requested by the one of the HTTP request and the XHR will take longer than the configured period of time to return to the client computing device.

8. The computer program product of claim 7, where, in causing the computer to replace the browser request one of the HTTP request and the XHR with the push notification, in response to determining to replace the browser request with the push notification based upon the characteristics of the browser request the computer readable program code when executed on the computer causes the computer to cause a series of push notifications to be issued to replace the browser request one of the HTTP request and the XHR for the updates to the requested data over time.

9. The computer program product of claim 7, where the one of the HTTP request and the XHR comprises the HTTP request, and where, in causing the computer to receive, at the web server computing device, the browser request, the computer readable program code when executed on the computer causes the computer to receive the HTTP request from
a push server that issued the HTTP request to the web server computing device in response to a push request sent to the push server from the client computing device; and
the computer readable program code when executed on the computer further causes the computer to, in response to the receiving the HTTP request from the push server:
instruct the client computing device to close an open socket used by the client computing device; and
send an HTTP response with results of the HTTP request to the push server on behalf of the client computing device, where the push notification is sent from the push server to the client computing device with the results of the HTTP response to the HTTP request.

10. The computer program product of claim 7, where,
in causing the computer to determine whether to replace the one of the HTTP request and the XHR with the push notification based upon whether the data requested by the one of the HTTP request and the XHR will take longer than the configured period of time to return to the client computing device, the computer readable program code when executed on the computer causes the computer to:
determine that the one of the HTTP request and the XHR comprises a polling request that would result in an HTTP connection being open for an extended duration of time that exceeds the configured period of time.

11. The computer program product of claim 7, where, in causing the computer to:
replace the one of the HTTP request and the XHR with the push notification in response to determining that the data requested by the one of the HTTP request and the XHR will take longer than the configured period of time to return to the client computing device, the computer readable program code when executed on the computer causes the computer to:
assign an identifier to the one of the HTTP request and the XHR received from the client computing device;
send an acknowledgement to the client computing device comprising the identifier assigned to the one of the HTTP request and the XHR; and
send results of the one of the HTTP request and the XHR to a push server with the identifier assigned to the one of the HTTP request and the XHR.

12. The computer program product of claim 11, where the computer readable program code when executed on the computer further causes the computer to:
generate a hash (H) of a timestamp at which the one of the HTTP request and the XHR was received; and
send the hash (H) along with the acknowledgement to the client computing device.

* * * * *